(12) United States Patent
Kampanakis (10) Patent No.: US 11,646,883 B2
(45) Date of Patent: May 9, 2023

(54) COMMUNICATION LATENCY BASED CRYPTOGRAPHIC NEGOTIATIONS

(71) Applicant: Cisco Technology, Inc., San Jose, CA (US)

(72) Inventor: Panagiotis Theodorou Kampanakis, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 501 days.

(21) Appl. No.: 16/809,135

(22) Filed: Mar. 4, 2020

(65) Prior Publication Data

US 2021/0281404 A1 Sep. 9, 2021

(51) Int. Cl.
*H04L 9/08* (2006.01)

(52) U.S. Cl.
CPC .......... *H04L 9/0875* (2013.01); *H04L 9/0852* (2013.01)

(58) Field of Classification Search
CPC ... H04L 9/0875; H04L 9/0852; H04L 63/166; H04L 63/205; H04L 9/14; H04W 12/63
See application file for complete search history.

(56) References Cited

U.S. PATENT DOCUMENTS

| | | | |
|---|---|---|---|
| 7,519,181 B2 | 4/2009 | Shaheen et al. | |
| 9,288,128 B1 * | 3/2016 | Palacios | ................ H04L 69/329 |
| 9,923,923 B1 | 3/2018 | Sharifi Mehr et al. | |
| 10,374,800 B1 | 8/2019 | Sharifi Mehr | |
| 2018/0262530 A1 * | 9/2018 | Sharifi Mehr | ........ H04L 63/166 |
| 2019/0103964 A1 | 4/2019 | Khandani | |
| 2019/0158371 A1 * | 5/2019 | Dillon | ................... H04L 43/087 |
| 2019/0199696 A1 * | 6/2019 | Bansal | ................. H04L 63/166 |

OTHER PUBLICATIONS

Jensen, Christian et al., "Location Privacy Techniques in Client-Server Architectures", LNCS 5231, pp. 31-58, Jan. 2009, 28 pages.
ScienceDirect, "Cryptography Algorithm", https://www.sciencedirect.com/topics/computer-science/cryptography-algorithm, downloaded Mar. 4, 2020, 13 pages.
NIST, "Post-Quantum Cryptography", https://csrc.nist.gov/Projects/post-quantum-cryptography/round-2-submissions, downloaded Mar. 4, 2020, 15 pages.
ImperialViolet, "Post-quantum confidentiality for TLS", https://www.imperialviolet.org/2018/04/11/pqconftls.html, Apr. 11, 2018, 7 pages.

(Continued)

*Primary Examiner* — Baotran N To
(74) *Attorney, Agent, or Firm* — Edell, Shapiro & Finnan, LLC (57) ABSTRACT

A method of selecting a particular cryptographic algorithm for an optimal cryptographic negotiation in which higher security level is obtained with an acceptable performance speed. The method includes exchanging information between a first device and a second device for establishing a secure communication connection, measuring network latency between the first device and the second device, and selecting a particular cryptographic algorithm from among a plurality of mutually supported cryptographic algorithms based on the network latency for establishing the secure communication connection.

20 Claims, 7 Drawing Sheets

(56) References Cited

OTHER PUBLICATIONS

Jansen, Wayne et al., "Proximity-based Authentication for Mobile Devices", https://www.nist.gov/publications/proximity-based-authentication-mobile-devices, Oct. 1, 2005, 7 pages.

Crockett, Eric et al., "Prototyping post-quantum and hybrid key exchange and authentication in TLS and SSH", Jul. 19, 2019, 24 pages.

Kwiatkowski, Kris, "Towards Post-Quantum Cryptography in TLS", https://blog.cloudflare.com/towards-post-quantum-cryptography-in-tls/, Jun. 20, 2019, 29 pages.

ImperialViolet, "CECPQ2", https://www.imperialviolet.org/2018/12/12/cecpq2.html, Dec. 12, 2018, 3 pages.

* cited by examiner

| ALGORITHM | NETWORK LATENCY METRIC RANGE |
|---|---|
| A | 0-10 |
| B | 10-50 |
| C | 50-200 |
| D | DEFAULT |

COMMUNICATION LATENCY BASED CRYPTOGRAPHIC NEGOTIATIONS

TECHNICAL FIELD

The present disclosure relates to secure network communications.

BACKGROUND

Security experts are actively developing and testing post-quantum cryptographic algorithms to address security concerns that may be posed by a future quantum computer. These post-quantum cryptographic algorithms are "heavier" in comparison to standard cryptographic algorithms currently in use today. That is, post-quantum cryptographic algorithms can increase the time it takes to establish a secure communication connection between devices. For example, the devices may need more time to perform cryptographic computations and/or may need to exchange more data which leads to longer negotiations for establishing the secure connection. In some instances, this delay may be unacceptable.

DESCRIPTION OF EXAMPLE EMBODIMENTS

Overview

Briefly, in one embodiment, methods are presented for cryptographic negotiations that are based on network latency between two devices. In these methods, information is exchanged between a first device and a second device for establishing a secure communication connection. A network latency between the first device and the second device is measured and a particular cryptographic algorithm is selected from among a plurality of mutually supported cryptographic algorithms based on the network latency for establishing the secure communication connection.

EXAMPLE EMBODIMENTS

To establish a secure communication connection, devices may negotiate with each other to select a cryptographic algorithm from a list of mutually supported cryptographic algorithms based on preference. For example, in client-server communications, the client device may advertise the cryptographic algorithms that it supports and the server selects one of those algorithms that it supports. The selection of a cryptographic algorithm may be random or based on a preset order. With the development of "heavier" cryptographic algorithms, such as post-quantum cryptographic algorithms, this approach may cause noticeable negotiation performance degradation especially for devices in close proximity to each other. In various example embodiments, network latency can be considered when selecting one of the mutually supported cryptographic algorithms.

Figure 1:
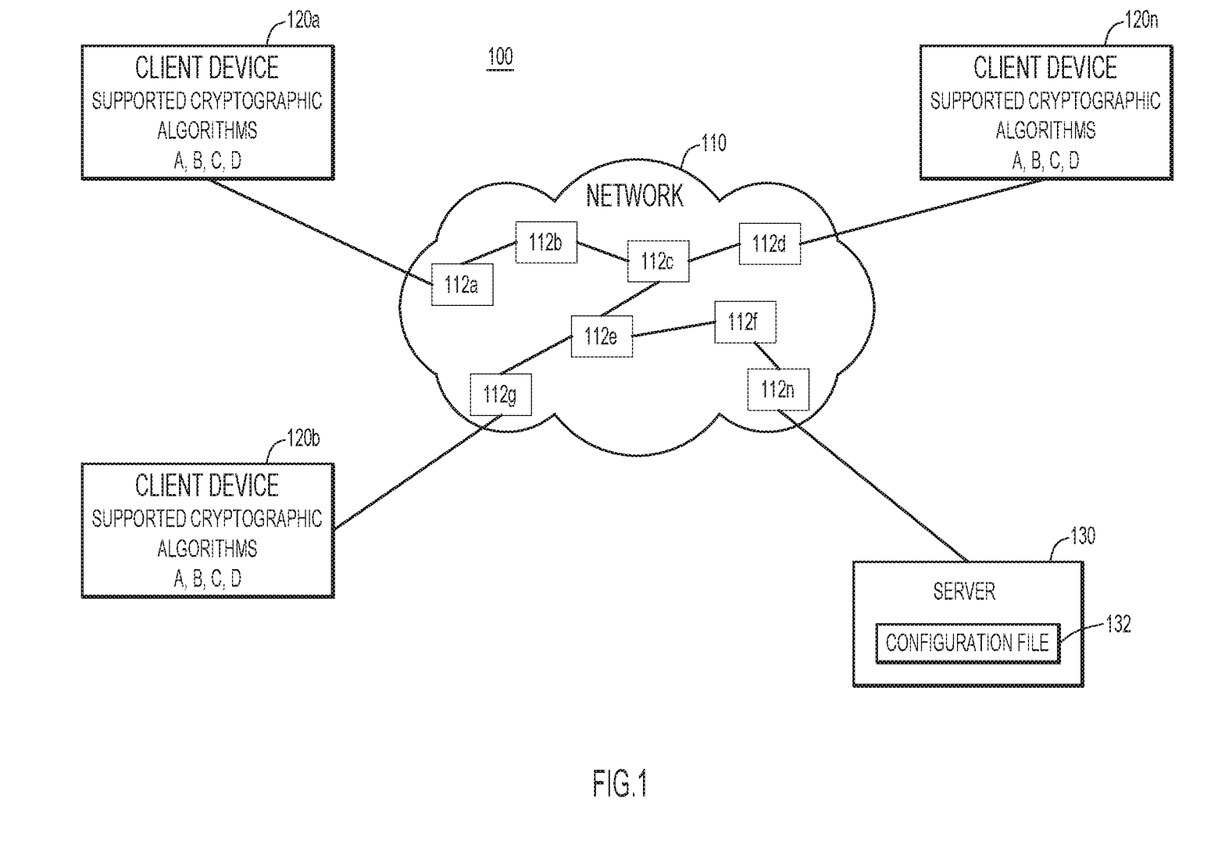
FIG. 1 is a block diagram illustrating a network topology in which network latency-based cryptographic negotiations may be employed, according to an example embodiment.

Reference is now made to FIG. 1 that illustrates a network environment 100 in which network latency-based cryptographic negotiations may be employed, according to an example embodiment. The network environment 100 includes a network 110 that enables communications among client devices 120a-n and a server 130.

The network 110 may be a public network or wide area network (WAN) but is not limited thereto. Client devices 120a-n may connect to the network 110 via an access network, but for purposes of the description presented herein, such an access network is considered to be part of the network 110. The network 110 includes network devices (nodes) 112a-n such as routers, switches, gateways, or other network devices (physical or virtual). The network devices 112a-n facilitate network communications between the client devices 120a-n, the server 130. The number of network devices 112a-n is not limited to that shown in FIG. 1 and may depend on a particular deployment of the network 110.

Client devices 120a-n may be devices such as desktop computers, laptop computers, smart phones, tablets or any other electronic devices now known or hereinafter developed that are capable of network communication. For example, client devices 120a-n are endpoints that may seek to establish secure communication connections with the server 130. Client devices 120a-n support various cryptographic algorithms, such as algorithms A, B, C, and D. To establish a secure communication connection, the client devices 120a-n may provide information about supported cryptographic algorithms to the server 130. The information may include a list naming or otherwise identifying the supported algorithms A, B, C, and D. Different client devices may support different cryptographic algorithms.

The server 130 hosts data, runs services, and/or provides resources to the client devices 120a-n. The server 130 may execute one or more applications, such as a service provider application or a content provider application. While one server 130 is depicted in FIG. 1, there may be multiple servers providing various services.

In an example embodiment, the server 130 may store internally or have access to a configuration file 132. The configuration file 132 includes information about various cryptographic algorithm(s) to select for various network latency ranges. The information is pre-computed and provided to the server 130 during provisioning, for example, or at any other time. The server 130 uses the configuration file 132 to make a decision about which particular cryptographic algorithm to select for use in a communication session with a given client device.

Additionally, the server 130 may be configured to measure network latency between itself and one of the client devices 120a-n (e.g., client device 120a) that is to establish a secure communication connection with the server 130. The network latency may represent distance proximity between the server 130 and the client device 120a. The distance proximity may be based on a round trip delay time associated with packets exchanged between the server 130 and the client device 120a, as detailed below with reference to FIG. 5.

According to another example embodiment, distance proximity may include geographic proximity between the server 130 and the client device 120a. For example, the server 130 is provisioned with information about its geographic coordinates or location. The server 130 further examines a routable address such as an Internet Protocol (IP) address of the client device 120a. Based on the routable address, the server 130 performs a lookup operation and determines the geographic location of the client device 120a. The server 130 then estimates the geographic proximity based on its own location and the determined location of the client device 120a.

According to yet another example embodiment, distance proximity may include hop count between the server 130 and the client device 120a. That is, the server 130 may determine that the hop count to communicate with the client device 120a is six intermediate devices (such as network device 112n, network device 112f, network device 112e, network device 112c, network device 112b, and network device 112a).

According to yet another example embodiment, distance proximity may be approximated using a probe or a ping. In this case, the server 130 transmits a ping or a probe to the client device 120a and receives a response. The time between transmitting the ping or probe and the arrival of the response is then used to approximate distance (network latency metric) between the server 130 and the client device 120a.

These are just few examples of measuring network latency and other techniques of determining network latency metric between two entities are within the scope of the example embodiments. Any other information that may suggest the distance proximity and/or traffic conditions and/or latency metric between two entities may be used as measured network latency.

The server 130 uses the measured network latency to select a cryptographic algorithm based on information in the configuration file 132 and information about supportable cryptographic algorithms provided from the client device 120a. Specifically, the server 130 determines a network latency range stored in the configuration file 132 that includes the measured network latency and selects a particular cryptographic algorithm corresponding to the determined network latency range from among a plurality of mutually supportable cryptographic algorithms.

Configuration file 132 is now described in further detail with reference to FIGS. 2A-4. In an example embodiment, algorithm performance testing is performed in which various cryptographic algorithms including post-quantum cryptographic algorithms are tested for performance against various network latencies. Based on performance information and the results of this algorithm performance testing, configuration information for the configuration file 132 is generated.

Figure 2A:
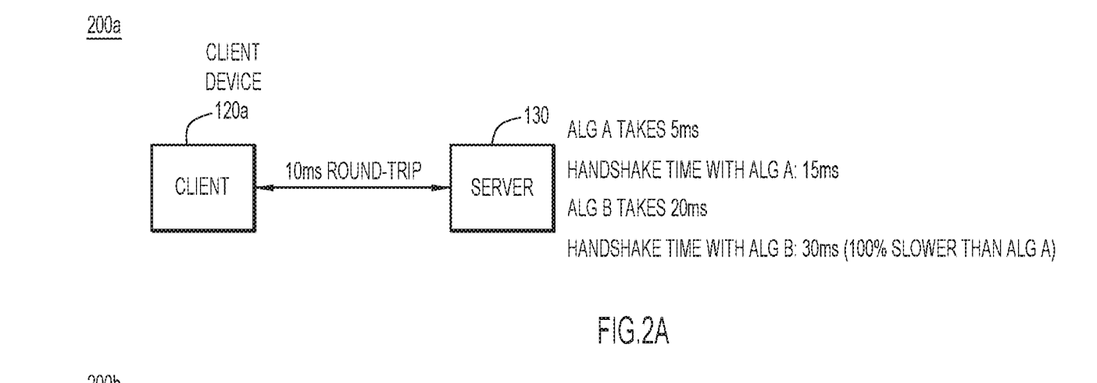
FIGS. 2A and 2B are diagrams illustrating performance degradation caused by various cryptographic algorithms during negotiations for establishing secure communication connections between a client device and a server, at different network latencies, according to an example embodiment.
Figure 2B:
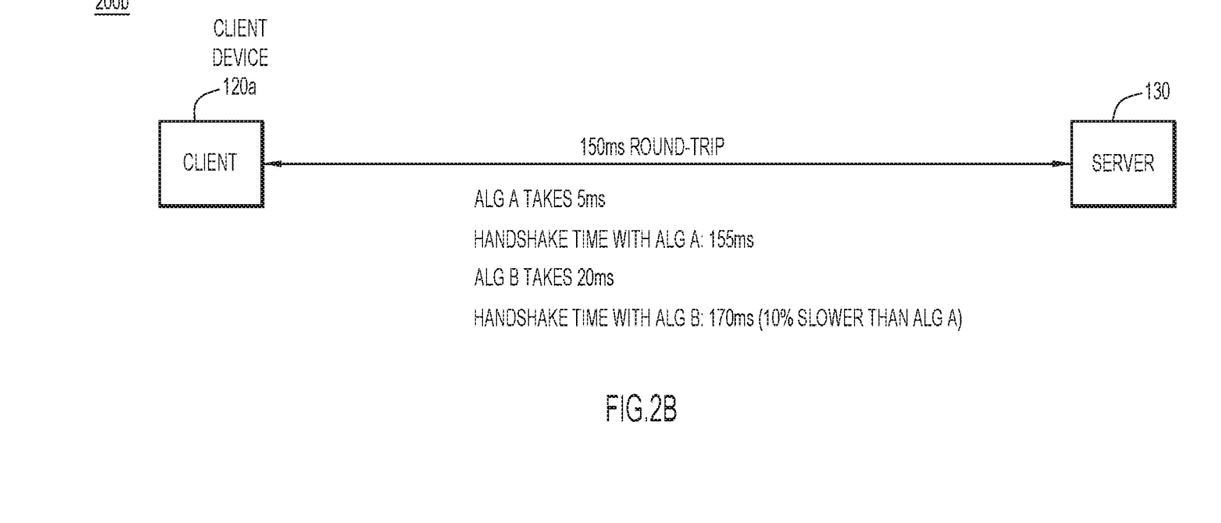

FIGS. 2A and 2B show diagrams 200a and 200b, respectively, illustrating performance degradation caused by various cryptographic algorithms during negotiations for establishing secure communication connections between the client device 120a and the server 130, at different network latencies. In FIGS. 2A and 2B, the client device 120a and the server 130 negotiate to establish a secure communication connection using a handshake process and the network latency is a round-trip delay time (round-trip). A fast performing cryptographic algorithm A (Alg A) that takes 5 milliseconds (ms) to perform the cryptographic negotiation is compared with a "heavy" cryptographic algorithm B (Alg B) that takes 20 ms to perform the cryptographic negotiation.

While keys or certificates of fast performing cryptographic algorithms may fit in one packet and thus take 5 ms to negotiate, the "heavier" cryptographic algorithms may be more computationally intensive or have a larger size key that needs more packets to be transferred and thus take 20 ms to negotiate. However, the "heavier" cryptographic algorithm with a post-quantum primitive may be preferred in some circumstances because of its security strength or the risk model. On the other hand, for time-sensitive applications, entities could decide to use a fast performing cryptographic algorithm. While the fast performing cryptographic algorithm uses a primitive of a lower security level, it also has less impact on the handshake speed. Configuration information is generated based on performance degradation considerations and transparently allows one of the entities to select a cryptographic algorithm from various available and mutually supported cryptographic algorithms based on measured network latency.

Fast performing cryptographic algorithms may include classical, asymmetric key algorithms such as Diffie-Helman and Rivest—Shamir—Adleman (RSA) algorithms and Elliptic Curve Cryptography (ECC) (ECDH, X25519, ECDSA, EdDSA) algorithms.

The "heavy" cryptographic algorithms include post-quantum algorithms such as Classic McEliece algorithm, Supersingular Isogeny Key Encapsulation (SIKE) algorithm, MQDSS algorithm, and SPHINCS+ algorithm.

These various cryptographic algorithms are provided by way of an example and other cryptographic algorithms currently known or later developed are within the scope of the example embodiments presented herein.

In FIG. 2A, the client device 120a and the server 130 have a measured network latency between them of 10 ms. As a result, the fast performing cryptographic algorithm A leads to a handshake time of 15 ms (10 ms network latency+5 ms introduced by Alg A) and the "heavy" cryptographic algorithm B leads to a handshake time of 30 ms (10 ms network latency+20 ms introduced by Alg B). The handshake time of the "heavy" cryptographic algorithm B is 100% slower (15 ms longer) than the handshake time of the fast performing cryptographic algorithm A.

In FIG. 2B, the client device 120a and the server 130 have a measured network latency between them of 150 ms. As a result, the fast performing cryptographic algorithm A leads to a handshake time of 155 ms (150 ms network latency+5 ms introduced by Alg A) and the "heavy" cryptographic algorithm B leads to a handshake time of 170 ms (150 ms network latency+20 ms introduced by Alg B). The handshake time of the "heavy" cryptographic algorithm B is approximately 10% slower (15 ms longer) than that handshake time of the fast performing cryptographic algorithm A.

Figure 3A:
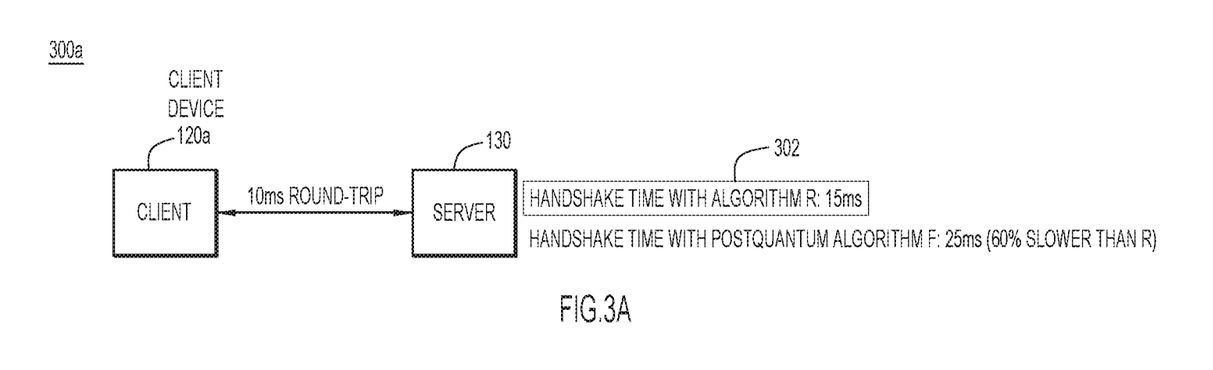
FIGS. 3A and 3B are diagrams illustrating a selection of various cryptographic signature algorithms for various network latencies to generate configuration information, according to an example embodiment.
Figure 3B:
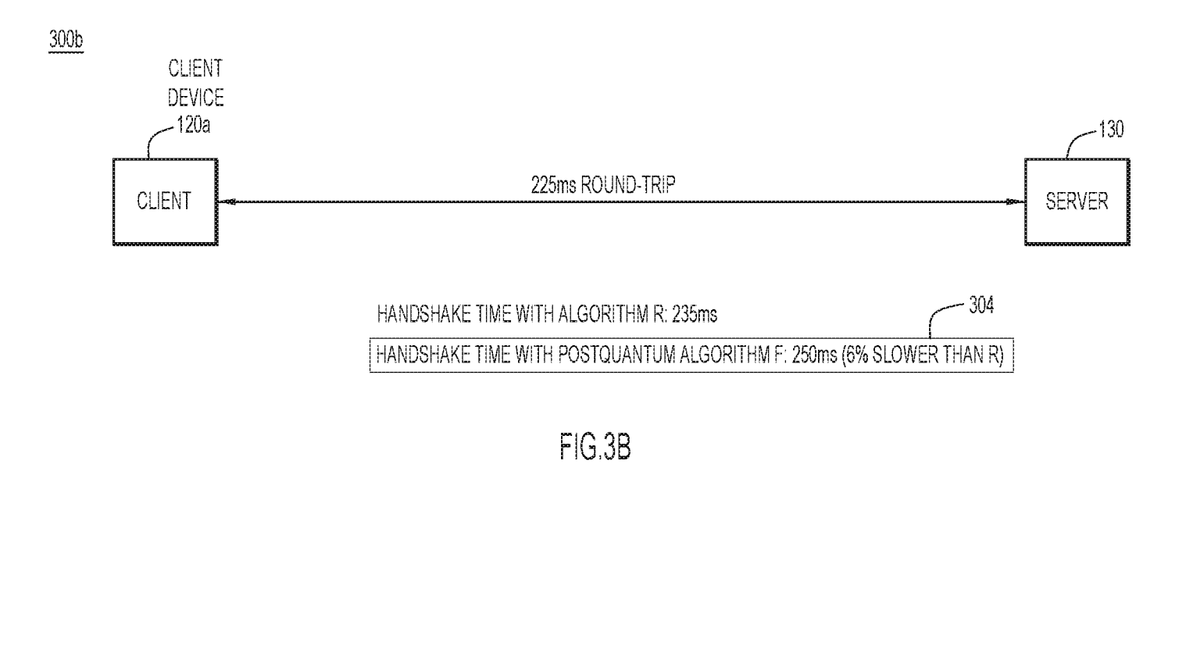

FIGS. 3A and 3B show diagrams 300a and 300b, respectively, illustrating a selection of various cryptographic algorithms for various network latencies to generate configuration information, according to an example embodiment. In FIGS. 3A and 3B, the client device 120a and the server 130 perform cryptographic negotiations to establish secure communication connections using a handshake process. The network latency is a round-trip delay time (round-trip), in one example. A fast performing signature algorithm R that takes 3 ms to calculate and a post-quantum algorithm F that takes 10 ms to calculate are performance tested for various network latencies. Further, the fast performing signature algorithm R takes 2 ms to transfer the smaller certificate and the post-quantum algorithm F takes 5 ms to transfer the larger certificates. Accordingly, the handshake time for the fast performing signature algorithm R is 5 ms and the handshake time for the post-quantum algorithm F is 15 ms. Thus, since algorithm F has a 10 ms signing time and certificates that are few kilobytes (kB) longer, the handshake for F takes 10 ms longer than algorithm R that has 3 ms signing time and uses smaller certificates.

In FIG. 3A, the client device 120a and the server 130 have a measured network latency between them of 10 ms. As a result, algorithm F takes 25 ms for a Transport Layer Security (TLS) handshake and algorithm R takes 15 ms for a TLS handshake. While algorithm F offers post-quantum security that algorithm R cannot provide, it is approximately 60% slower than algorithm R, which may be an unacceptable negotiation delay. As such, at 302, when the network latency is 10 ms or less, algorithm R is selected for establishing a secure communication connection and may be added to the configuration information as the preferred algorithm to use for entities with low network latency of 10 ms.

In FIG. 3B, the client device 120a and the server 130 have a measured network latency between them of 225 ms. Algorithm R takes 3 ms for calculations but takes 7 ms for transferring the smaller certificate over a longer distance. That is, algorithm R has a handshake time of 235 ms (225+3+7). Algorithm F takes 10 ms to calculate but takes 15 ms to transfer the larger certificate over the longer distance. In other words, algorithm F has a handshake time of 250 ms (225+10+15). Accordingly, algorithm F is 6% slower than the algorithm R. This may be an acceptable negotiation delay for some situations. At 304, algorithm F is selected for higher network latencies and may be added to the configuration information as a preferred algorithm to use for entities with high network latency.

As another example, a SIKE post-quantum key encapsulation mechanism (KEM) algorithm may be used for a key exchange that takes 5 ms (key generation and encapsulation/decapsulation time). For the entities that are 30 hops away with a round-trip of 100 ms, adding 5 ms would be approximately a 5% slowdown, which may be acceptable in some situations. For entities that are a few hops away with a round-trip of 10 ms, SIKE's extra 5 ms would have a significant impact on the handshake time and thus, may be unacceptable. A much faster X25519 key exchange may be used instead of the SIKE post-quantum KEM algorithm for this latter scenario.

While the example embodiments described above compare performance of various cryptographic algorithms to one another, in another example embodiment, current status quo of the handshake time may be used to select one cryptographic algorithm over another cryptographic algorithm.

Figure 4:
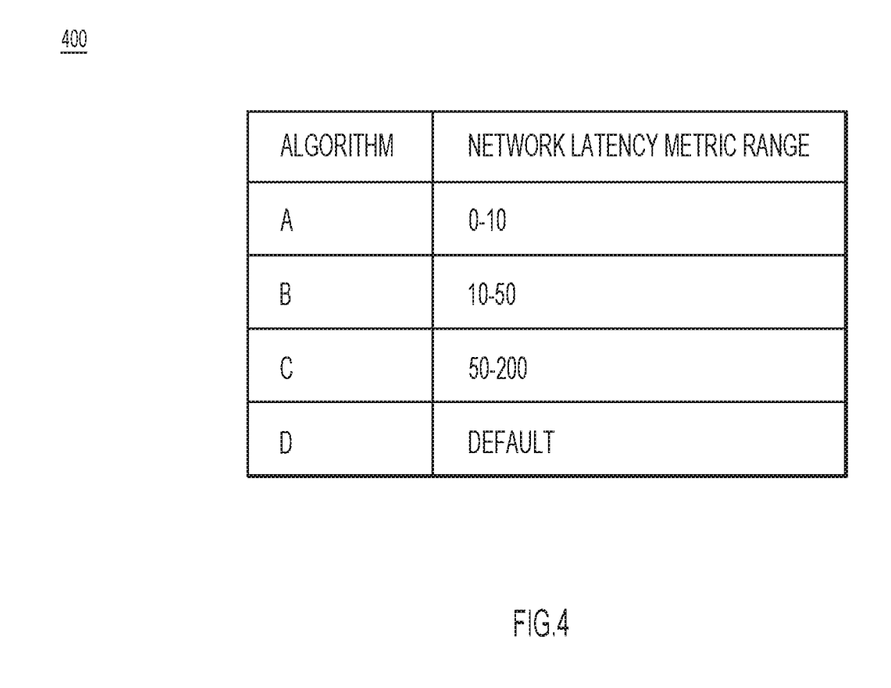
FIG. 4 is a diagram illustrating configuration information indicating different cryptographic algorithms to be used for different network latency ranges, according to an example embodiment.

Based on the performance testing, the configuration information is generated. Flexibility is added to cryptographic negotiations so that performance is not significantly affected. When there are multiple overlapping acceptable algorithms between two entities, agreeing on an algorithm of adequate security can be based on an optimal negotiation speed. For example, the configuration information may indicate to select algorithm A that is less (but adequately) secure when two entities are in close proximity (low network latency) and to select algorithm B that is more secure than algorithm A when the two entities are far away (high network latency). In short, various cryptographic algorithms are benchmarked for different network latency ranges and acceptable cryptographic algorithms for the different network latency ranges are stored as configuration information in the configuration file 132.

FIG. 4 is a diagram illustrating configuration information 400 indicating different cryptographic algorithms to be used for different network latency ranges, according to an example embodiment. In the configuration information 400, algorithm A has been benchmarked and adds an acceptable performance load (e.g., total handshake time) up to a network latency range of 10 ms (0-10 ms); algorithm B adds an acceptable performance load from 10 ms up to 50 ms; algorithm C adds an acceptable performance load from 50 ms up to 200 ms; and algorithm D is a default cryptographic algorithm that is used if the network latency range between the two entities does not fall in any of the above network latency ranges or if the network latency range cannot be determined.

As a variation, the configuration information may further include additional attributes. That is, the configuration information 400 can further be customizable based on attributes of a particular algorithm (security level and priority preference type, etc.).

Figure 5:
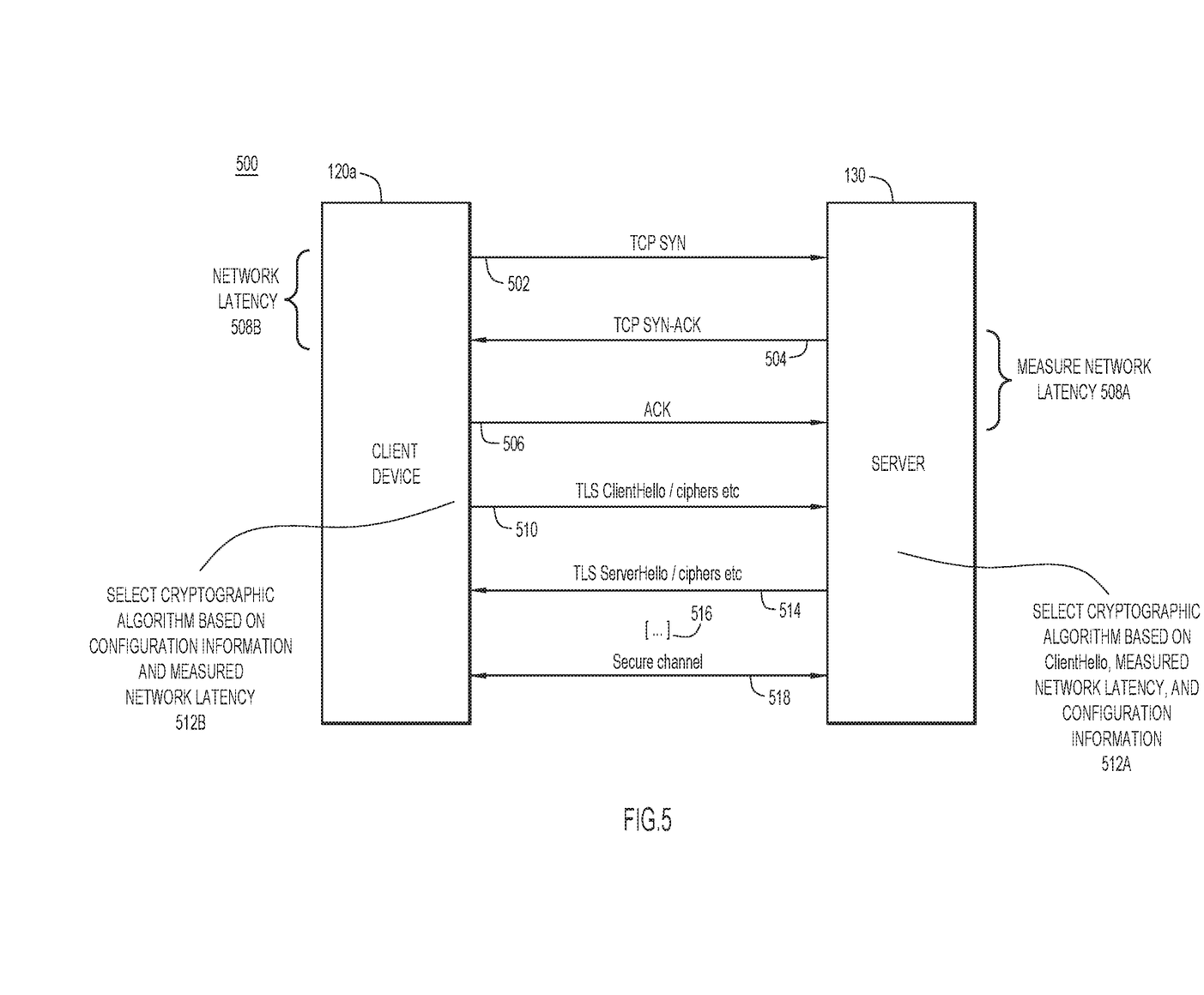
FIG. 5 is a sequence diagram illustrating a method of establishing a secure communication connection between a client device and a server by selecting a cryptographic algorithm based on network latency, according to various example embodiments.

FIG. 5 is a sequence diagram illustrating a method 500 for establishing a secure communication connection between the client device 120a and the server 130 by selecting a cryptographic algorithm based on network latency, according to various example embodiments.

The method 500 establishes the secure communication connection in accordance with Transport Layer Security (TLS) protocol but this is just an example. The TLS is a standard mechanism to provide a secure communication connection between two entities in IP networks. TLS creates secure sessions and establishes a per-session key that is used to encrypt Layer 4 payload and provide confidentiality to upper layer protocols.

Other than the "benchmarking work" explained above that is performed to compute the configuration information 400 included in the configuration file 132, no additional changes are imposed in the cryptographic negotiations.

At 502, the server 130 receives a new connection from a client device 120a e.g., TCP synchronization (SYN) message. The server 130 then measures the network latency to the client device 120a based on a further packet exchange. In particular, at 504, the server 130 transmits to the client device 120a a TCP synchronization-acknowledgment (SYN-ACK) packet, and at 506, the server 130 receives an ACK packet from the client device 120a. At 508a, the network latency is measured and is a round-trip time delay from the time the server 130 transmitted the SYN-ACK packet at 504 to the time the server received ACK packet at 506.

At 510, the server 130 receives a TLS ClientHello packet that includes information indicating a plurality of cryptographic algorithms (ciphers) supported by the client device 120a and any other information that may be needed to establish the secure communication connection.

At 512*a*, the server 130 selects one of the plurality of cryptographic algorithms supported by the client device 120*a* based on the ClientHello that includes information indicating ciphers supported by the client device 120*a*, the configuration information 400 in the configuration file 132, and the network latency measured at 508*a*.

At 514, the server 130 transmits to the client device 120*a* a TLS ServerHello packet that includes the cryptographic algorithm selected at 512*a* along with any other information that may be needed to establish the secure communication connection. In particular, the server 130 measures the network latency by tracking the TCP handshake before sending the ServerHello that includes the selected cryptographic algorithm. The server 130 supports many of acceptably secure cryptographic algorithms offered by the client device 120*a* and chooses the most secure one that will perform acceptably for the measured network latency based on the configuration information 400. The selection is made transparently to the client device 120*a*, and in this regard, there may be no changes made to the client device 120*a*.

At 516, the communication negotiations proceed based on the TLS protocol and at 518, the secure communication channel is established between the client device 120*a* and the server 130 encrypting and decrypting data using the cryptographic algorithm selected at 512*a*.

According to another example embodiment, the configuration information 400 may be accessed by the client device 120*a* or may be pre-loaded onto the client device 120*a* (instead of the server 130, for example) in a form of the configuration file 132. In this variation, the client device 120*a* is proactive and is upgraded with client software to enable the client device 120*a* to select an acceptable cryptographic algorithm to advertise to the server based on the benchmarked configuration.

In this variation, at 508*b*, the client device 120*a* measures the network latency instead of the server 130, thus operation 508*a* is not performed. The network latency is measured based on a round trip time between the TCP SYN packet at 502 and the TCP SYN-ACK packet at 504. Further, at 512*b* (operation 512*a* is not performed), the client device 120*a* selects which cryptographic algorithm to advertise to the server 130 in the TLS ClientHello packet at 510 based on the network latency measured at 508*b* and based on the configuration information 400. According to another variation, since the client device 120*a* initiates the negotiations with the server 130 for a secure communication connection, the client device 120*a* may ping the server 130 to measure the network latency metric. The client device 120*a* may ping the server 130 to measure the network latency and then advertise only the selected cryptographic algorithm. In this variation, there may be no changes made to the server 130.

According to various example embodiments, an entity (one of the client devices 120*a-n*, the server 130) measures the network latency. Based on the measured network latency, a particular cryptographic algorithm that provides an acceptable performance is selected from mutually supportable cryptographic algorithms using the configuration information 400. Various example embodiments provide a mechanism in which cryptographic algorithm performance and network latency are used to select cryptographic algorithms that provide optimal cryptographic negotiation (higher security level with acceptable speed) without imposing any protocol specific updates. As cryptographic algorithms keep getting "heavier", this mechanism optimizes cryptographic communication performance. This mechanism provides for prioritized cryptographic algorithms of satisfactory security and satisfactory performance.

Figure 6:
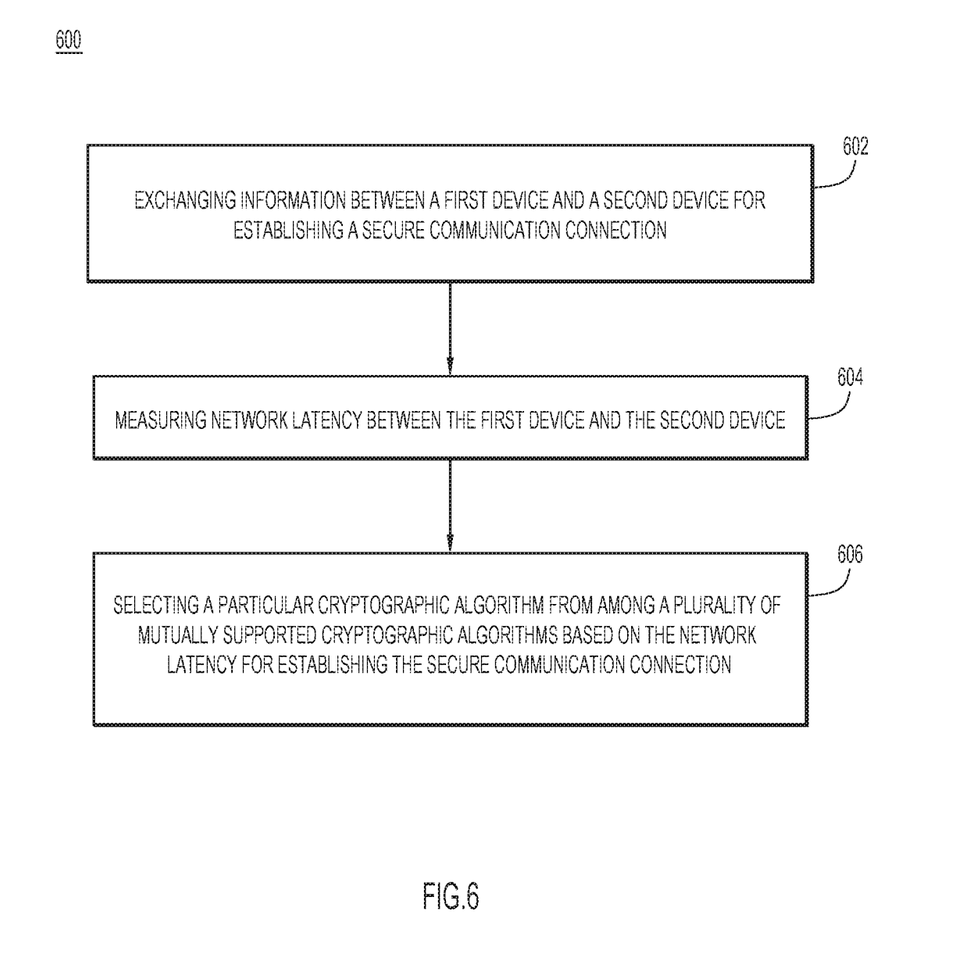
FIG. 6 is a flowchart generally depicting a method of selecting a particular cryptographic algorithm for establishing a secure communication connection between two devices, according to an example embodiment.

Turning now to FIG. 6, a flowchart is now described of a method 600 for selecting a particular cryptographic algorithm for establishing a secure communication connection between two devices, according to an example embodiment. The method 600 may be performed by a device e.g., one of the client devices 120*a-n* or the server 130, shown in FIGS. 1-3B and 5.

At 602, information is exchanged between a first device and a second device for establishing a secure communication connection.

At 604, network latency between the first device and the second device is measured.

At 606, a particular cryptographic algorithm is selected from among a plurality of mutually supported cryptographic algorithms based on the network latency for establishing the secure communication connection.

In the method 600, the operation 604 of measuring the network latency between the first device and the second device may include determining a distance proximity between the first device and the second device. The distance proximity may include one or more of geographic proximity between the first device and the second device, round trip delay time between the first device and the second device, or a hop count between the first device and the second device.

The method 600 may further include storing configuration information including a plurality of network latency ranges, each associated with a corresponding cryptographic algorithm that provides an acceptable performance load for a respective network latency range.

In one form, the operation of storing the configuration information may include storing a first network latency range from among the plurality of network latency ranges. The first network latency range may be associated with a post-quantum cryptographic algorithm. The operation of storing the configuration information may further include storing a second network latency range from among the plurality of network latency ranges. The second network latency range may be associated with another cryptographic algorithm that is of a lower security level than the post-quantum cryptographic algorithm. The first network latency range may have a higher network latency than the second network latency range.

In the method 600, the operation 606 of selecting the particular cryptographic algorithm may include determining that the network latency is within a first latency range from among the plurality of network latency ranges and selecting the particular cryptographic algorithm associated with the first latency range.

According to one or more example embodiments, the operation 602 of exchanging the information between the first device and the second device may include providing, by the first device to the second device, a first packet for establishing the secure communication connection and obtaining, by the first device from the second device, a second packet in response to the first packet. Further, the operation 604 of measuring the network latency may include determining, by the first device, a round trip time between the first device and the second device based on the first packet and the second packet.

In the method 600, the first device may be a server and the second device may be a client device. In this form, the method 600 may further include obtaining, by the first device from the second device, first information indicating cryptographic algorithms supported by the second device and providing, by the first device to the second device, second information indicating the particular cryptographic algorithm preferred by the first device.

In the method 600, the first device may be a client device that stores cryptographic algorithms supported by the client device and the second device may be a server. In this case, the method 600 may further include providing, by the first device to the second device, cipher information indicating the particular cryptographic algorithm preferred by the first device.

In one form, the operation 604 of measuring the network latency between the first device and the second device may include determining a number of intermediate devices between the first device and the second device based on the information. The intermediate devices are hops between the first device and the second device for establishing the secure communication connection.

According to one or more example embodiments, the operation 606 of selecting the particular cryptographic algorithm may include selecting a post quantum cryptographic algorithm, as the particular cryptographic algorithm, based on the number of intermediate devices exceeding a first threshold and selecting another cryptographic algorithm that is of a lower security level, as the particular cryptographic algorithm, based on the number of intermediate devices being less than a second threshold.

Figure 7:
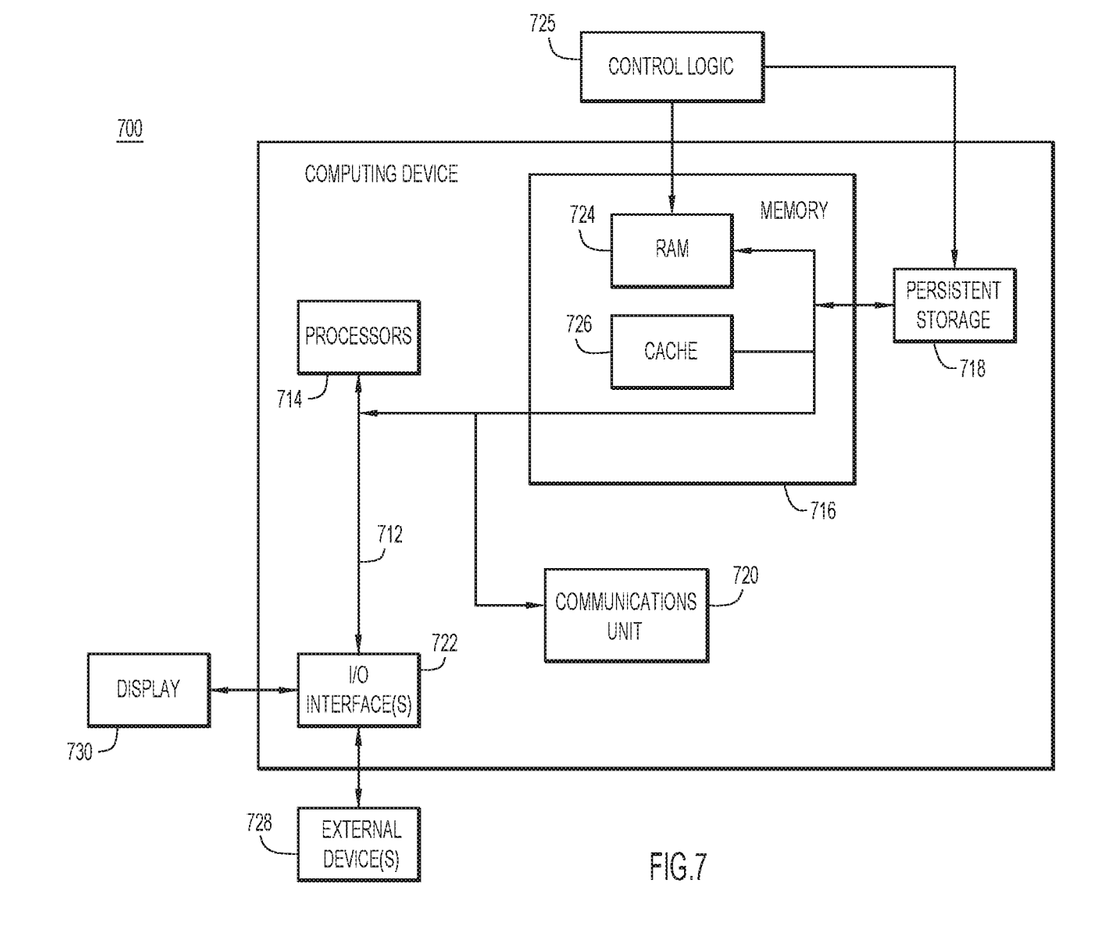
FIG. 7 is a hardware block diagram of a device configured to perform the techniques for selecting a particular cryptographic algorithm for establishing a secure communication connection between two devices, according to various example embodiments.

FIG. 7 is a hardware block diagram illustrating a computing device 700 that may perform the functions of a device referred to herein in connection with FIGS. 1, 5, and 6, according to various example embodiments. The computing device 700 performs the functions of a client device from among the client devices 120a-n, the server 130, as described above in connection with FIGS. 1-3B, 5, and 6.

It should be appreciated that FIG. 7 provides only an illustration of one example embodiment and does not imply any limitations with regard to the environments in which different embodiments may be implemented. Many modifications to the depicted environment may be made.

As depicted, the computing device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 725 may be stored in memory 716 or persistent storage 718 for execution by processor(s) 714.

The control logic 725 includes instructions that, when executed by the computer processor(s) 714, cause the computing device 700 to exchange information between a first device and a second device for establishing a secure communication connection, to measure network latency between the first device and the second device, and select a particular cryptographic algorithm from among a plurality of mutually supported cryptographic algorithms based on the network latency for establishing the secure communication connection. The control logic 725 may be stored in the memory 716 or the persistent storage 718 for execution by the computer processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computing device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., local area network (LAN), wide area network (WAN), Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

In still another example embodiment, an apparatus is provided. The apparatus is one of a client devices 120a-n or the server 130. The apparatus includes a communication interface, a memory configured to store executable instructions, and a processor coupled to the communication interface and the memory. The processor is configured to perform operations that include exchanging information between the apparatus and another device for establishing a secure communication connection, measuring network latency between the apparatus and the other device, and selecting a particular cryptographic algorithm from among a plurality of mutually supported cryptographic algorithms based on the network latency for establishing the secure communication connection.

In one form, the processor may further be configured to perform the operation of measuring the network latency between the apparatus and the other device by determining a distance proximity between the apparatus and the other device. The distance proximity may include one or more of geographic proximity between the apparatus and the other device, round trip delay time between the apparatus and the other device, or a hop count between the apparatus and the other device.

The processor may further be configured to perform an additional operation of storing configuration information including a plurality of network latency ranges. Each of the plurality of network latency ranges is associated with a corresponding cryptographic algorithm that provides an acceptable performance load for a respective network latency range.

In one or more example embodiments, the processor may further be configured to perform the operation of storing by storing a first network latency range from among the plurality of network latency ranges, where the first network latency range associated with a post-quantum cryptographic algorithm and storing a second network latency range from among the plurality of network latency ranges, where the second network latency range associated with another cryptographic algorithm that is of a lower security level than the post-quantum cryptographic algorithm. The first network latency range has a higher network latency than the second network latency range.

The processor may further be configured to perform the operation of selecting the particular cryptographic algorithm by determining that the network latency is within a first latency range from among the plurality of network latency ranges and selecting the particular cryptographic algorithm associated with the first latency range.

In yet another example embodiment, one or more non-transitory computer readable storage media encoded with instructions are provided. When the media is executed by the processor, the instructions cause the processor to perform operations including exchanging information between a first device and a second device for establishing a secure communication connection, measuring network latency between the first device and the second device, and selecting a particular cryptographic algorithm from among a plurality of mutually supported cryptographic algorithms based on the network latency for establishing the secure communication connection.

The instructions may cause the processor to perform the operation of measuring the network latency by determining a distance proximity between the first device and the second device. The distance proximity may include one or more of geographic proximity between the first device and the second device, round trip delay time between the first device and the second device, or a hop count between the first device and the second device.

In one form, the instructions may further cause the processor to perform an additional operation including storing configuration information including a plurality of network latency ranges, each associated with a corresponding cryptographic algorithm that provides an acceptable performance load for a respective network latency range.

The instructions may further cause the processor to perform the operation of storing the configuration information by storing a first network latency range from among the plurality of network latency ranges, where the first network latency range associated with a post-quantum cryptographic algorithm and storing a second network latency range from among the plurality of network latency ranges, where the second network latency range associated with another cryptographic algorithm that is of a lower security level than the post-quantum cryptographic algorithm. The first network latency range has a higher network latency than the second network latency range.

In another form, the instructions may further cause the processor to select the particular cryptographic algorithm by determining that the network latency is within a first latency range from among the plurality of network latency ranges and selecting the particular cryptographic algorithm associated with the first latency range.

The embodiments presented may be in other various other forms, such as a system or a computer program product. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   exchanging information between a first device and a second device for establishing a secure communication connection, wherein the information includes a first set of cryptographic algorithms supported by one of the first device and the second device;
   measuring network latency between the first device and the second device;
   determining a plurality of mutually supported cryptographic algorithms based on the first set of cryptographic algorithms and a second set of cryptographic algorithms supported by the other of the first device and the second device; and
   selecting a particular cryptographic algorithm from among the plurality of mutually supported cryptographic algorithms based on the network latency for establishing the secure communication connection.

2. The method of claim 1, wherein measuring the network latency between the first device and the second device includes:
   determining a distance proximity between the first device and the second device,
   wherein the distance proximity includes one or more of geographic proximity between the first device and the second device, round trip delay time between the first device and the second device, or a hop count between the first device and the second device.

3. The method of claim 1, further comprising:
   storing configuration information including a plurality of network latency ranges, each of the plurality of network latency ranges associated with a corresponding cryptographic algorithm that provides an acceptable performance load for a respective network latency range.

4. The method of claim 3, wherein storing the configuration information includes:
   storing a first network latency range from among the plurality of network latency ranges, the first network latency range associated with a post-quantum cryptographic algorithm; and
   storing a second network latency range from among the plurality of network latency ranges, the second network latency range associated with another cryptographic algorithm that is of a lower security level than the post-quantum cryptographic algorithm,
   wherein the first network latency range has a higher network latency than the second network latency range.

5. The method of claim 3, wherein selecting the particular cryptographic algorithm includes:
   determining that the network latency is within a first latency range from among the plurality of network latency ranges; and
   selecting the cryptographic algorithm associated with the first latency range.

6. The method of claim 1, wherein exchanging the information between the first device and the second device includes:
   providing, by the first device to the second device, a first packet for establishing the secure communication connection; and
   obtaining, by the first device from the second device, a second packet in response to the first packet,
   wherein measuring the network latency includes:
   determining, by the first device, a round trip time between the first device and the second device based on the first packet and the second packet.

7. The method of claim 1, wherein the first device is a server and the second device is a client device, and further comprising:
   obtaining, by the first device from the second device, first information indicating the first set of cryptographic algorithms supported by the second device; and
   providing, by the first device to the second device, second information indicating the particular cryptographic algorithm preferred by the first device.

8. The method of claim 1, wherein the first device is a client device that stores cryptographic algorithms supported by the client device and the second device is a server, the method further comprising:
   providing, by the first device to the second device, cipher information indicating the particular cryptographic algorithm preferred by the first device.

9. The method of claim 1, wherein measuring the network latency between the first device and the second device includes:
   determining a number of intermediate devices between the first device and the second device based on the information exchanged between the first device and the second device for establishing the secure communication connection, wherein the number of intermediate devices are hops between the first device and the second device for establishing the secure communication connection.

10. The method of claim 9, wherein selecting the particular cryptographic algorithm includes:
    selecting a post quantum cryptographic algorithm, as the particular cryptographic algorithm, based on the number of intermediate devices exceeding a first threshold; and
    selecting another cryptographic algorithm that is of a lower security level, as the particular cryptographic algorithm, based on the number of intermediate devices being less than a second threshold.

11. An apparatus comprising:
    a communication interface;
    a memory configured to store executable instructions; and
    a processor coupled to the communication interface and the memory and configured to perform operations including:
        exchanging information between the apparatus and another device for establishing a secure communication connection, wherein the information includes a first set of cryptographic algorithms supported by one of the apparatus and the other device;
        measuring network latency between the apparatus and the other device;
        determining a plurality of mutually supported cryptographic algorithms based on the first set of cryptographic algorithms and a second set of cryptographic algorithms supported by the other of the apparatus and the other device; and
        selecting a particular cryptographic algorithm from among the plurality of mutually supported cryptographic algorithms based on the network latency for establishing the secure communication connection.

12. The apparatus of claim 11, wherein the processor is configured to perform the operation of measuring the network latency between the apparatus and the other device by:
    determining a distance proximity between the apparatus and the other device, wherein the distance proximity includes one or more of geographic proximity between the apparatus and the other device, round trip delay time between the apparatus and the other device, or a hop count between the apparatus and the other device.

13. The apparatus of claim 11, wherein the processor is further configured to perform an additional operation of:
    storing configuration information including a plurality of network latency ranges, each of the plurality of network latency ranges associated with a corresponding cryptographic algorithm that provides an acceptable performance load for a respective network latency range.

14. The apparatus of claim 13, wherein the processor is further configured to perform the operation of storing the configuration information by:
    storing a first network latency range from among the plurality of network latency ranges, the first network latency range associated with a post-quantum cryptographic algorithm; and
    storing a second network latency range from among the plurality of network latency ranges, the second network latency range associated with another cryptographic algorithm that is of a lower security level than the post-quantum cryptographic algorithm,
    wherein the first network latency range has a higher network latency than the second network latency range.

15. The apparatus of claim 13, wherein the processor is further configured to perform the operation of selecting the particular cryptographic algorithm by:
    determining that the network latency is within a first latency range from among the plurality of network latency ranges; and
    selecting the particular cryptographic algorithm associated with the first latency range.

16. One or more non-transitory computer readable storage media encoded with instructions that, when executed by a processor, cause the processor to perform operations including:
    exchanging information between a first device and a second device for establishing a secure communication connection, wherein the information includes a first set of cryptographic algorithms supported by one of the first device and the second device;
    measuring network latency between the first device and the second device;
    determining a plurality of mutually supported cryptographic algorithms based on the first set of cryptographic algorithms and a second set of cryptographic algorithms supported by the other of the first device and the second device; and
    selecting a particular cryptographic algorithm from among the plurality of mutually supported cryptographic algorithms based on the network latency for establishing the secure communication connection.

17. The one or more non-transitory computer readable storage media according to claim 16, wherein the instructions cause the processor to perform the operation of measuring the network latency by:
    determining a distance proximity between the first device and the second device, wherein the distance proximity includes one or more of geographic proximity between the first device and the second device, round trip delay time between the first device and the second device, or a hop count between the first device and the second device.

18. The one or more non-transitory computer readable storage media according to claim 16, wherein the instructions cause the processor to perform an additional operation including:
    storing configuration information including a plurality of network latency ranges, each of the plurality of network latency ranges associated with a corresponding cryptographic algorithm that provides an acceptable performance load for a respective network latency range.

19. The one or more non-transitory computer readable storage media according to claim 18, wherein the instructions cause the processor to perform the operation of storing the configuration information by:
    storing a first network latency range from among the plurality of network latency ranges, the first network latency range associated with a post-quantum cryptographic algorithm; and
    storing a second network latency range from among the plurality of network latency ranges, the second network latency range associated with another cryptographic algorithm that is of a lower security level than the post-quantum cryptographic algorithm,
    wherein the first network latency range has a higher network latency than the second network latency range.

20. The method of claim 1, wherein selecting the particular cryptographic algorithm includes:
- selecting a first cryptographic algorithm from the plurality of mutually supported cryptographic algorithms based on the network latency being within a first latency range; and
- selecting a second cryptographic algorithm, which has a lower security level than the first cryptographic algorithm from the plurality of mutually supported cryptographic algorithms, based on the network latency being within a second latency range,
- wherein the second latency range has a higher network latency than the first latency range.

\* \* \* \* \*